US012118876B1

(12) United States Patent
Niendorff

(10) Patent No.: US 12,118,876 B1
(45) Date of Patent: Oct. 15, 2024

(54) TARGETED ALERT SYSTEM FOR A WORK ENVIRONMENT

(71) Applicant: Mindwave Technologies LLC, Knoxville, TN (US)

(72) Inventor: Daniel Niendorff, Knoxville, TN (US)

(73) Assignee: Mindwave Technologies LLC, Knoxville, TN (US)

( * ) Notice: Subject to any disclaimer, the term of this patent is extended or adjusted under 35 U.S.C. 154(b) by 0 days.

(21) Appl. No.: 18/608,273

(22) Filed: Mar. 18, 2024

Related U.S. Application Data

(63) Continuation of application No. PCT/US2023/077312, filed on Oct. 19, 2023.

(51) Int. Cl.
*G08B 29/18* (2006.01)
*G08B 21/18* (2006.01)
*H04L 51/214* (2022.01)

(52) U.S. Cl.
CPC ............. *G08B 29/18* (2013.01); *G08B 21/18* (2013.01); *H04L 51/214* (2022.05)

(58) Field of Classification Search
CPC ...... G08B 29/18; G08B 21/18; G08B 27/001; G08B 25/10; A61B 5/0022; A61B 5/746; G06F 16/735; G06F 16/9535; H04L 51/214
See application file for complete search history.

(56) References Cited

U.S. PATENT DOCUMENTS

| | | | | |
|---|---|---|---|---|
| 10,123,729 | B2 * | 11/2018 | Dyell | A61B 5/746 |
| 10,278,027 | B2 * | 4/2019 | Oliver | H04W 4/30 |
| 11,240,263 | B2 * | 2/2022 | Manadhata | H04L 63/1441 |
| 11,431,792 | B2 * | 8/2022 | Marwah | H04L 67/104 |
| 2015/0364022 | A1 | 12/2015 | Dyell et al. | |
| 2017/0311903 | A1 | 11/2017 | Davis et al. | |
| 2017/0352257 | A1 | 12/2017 | Oliver et al. | |
| 2020/0028701 | A1 | 1/2020 | Liu et al. | |

OTHER PUBLICATIONS

International Search Report and Written Opinion for PCT/US2023/077312 dated Feb. 15, 2024.

* cited by examiner

*Primary Examiner* — John A Tweel, Jr.
(74) *Attorney, Agent, or Firm* — Neal, Gerber & Eisenberg LLP

(57) ABSTRACT

A targeted alert system for a work environment is described. The alert system is configured to send a targeted alert only to an identified recipient responsible for addressing an identified fault condition at the time of the alert. If that recipient does not respond or is determined by the system to be unavailable, the system may identify another recipient or revert to a general alert. The alert system comprises an alert control unit connected to an alert-generating monitoring device that is configured to intercept a general alert and temporarily disable it while a targeted alert is attempted. The alert control unit may have a self-locating capability, allowing it to append a location to the alert information. Targeted alerts are received by targeted workers via identifier devices that may be equipped with presence detection and response capabilities.

20 Claims, 7 Drawing Sheets

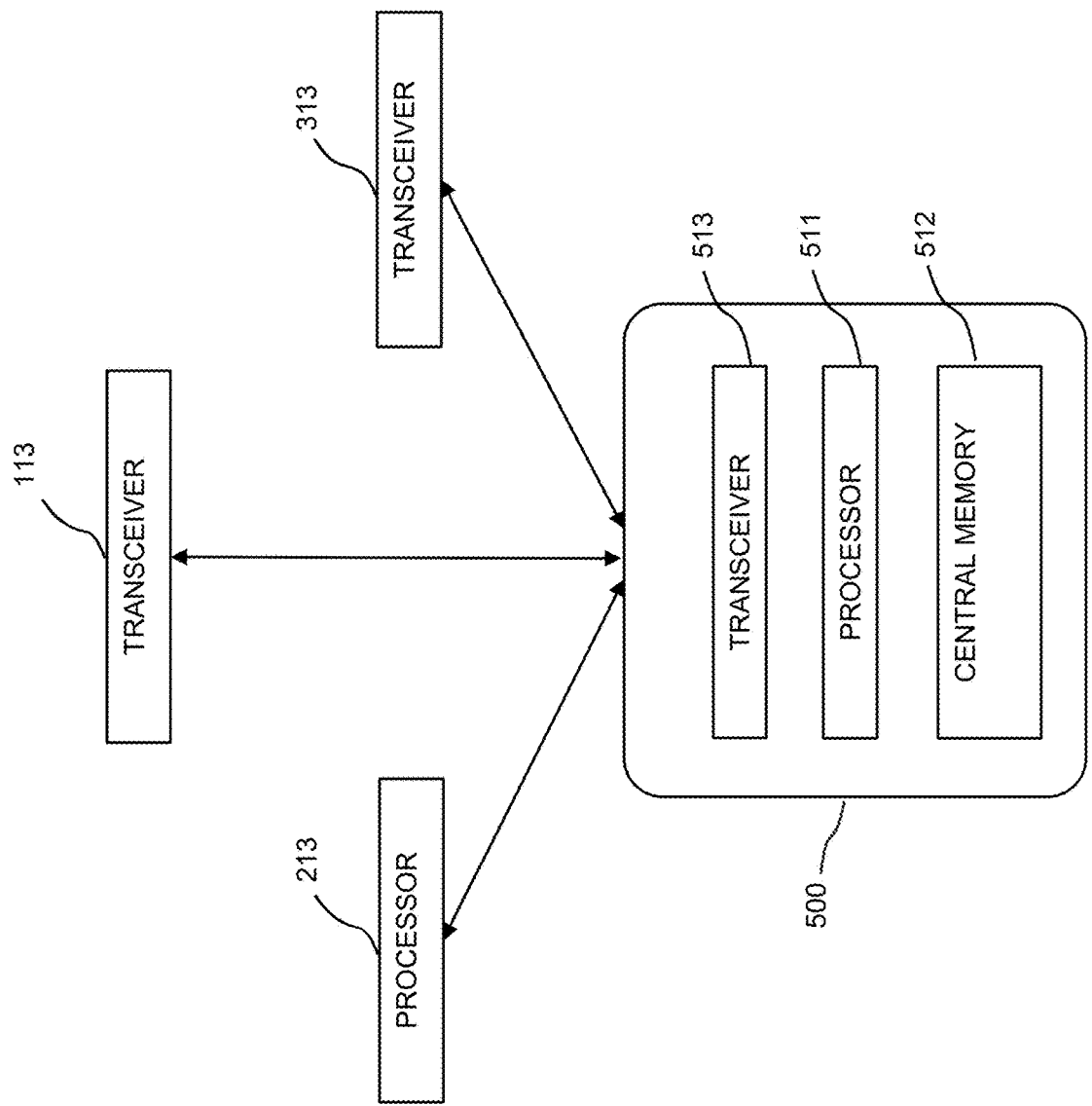

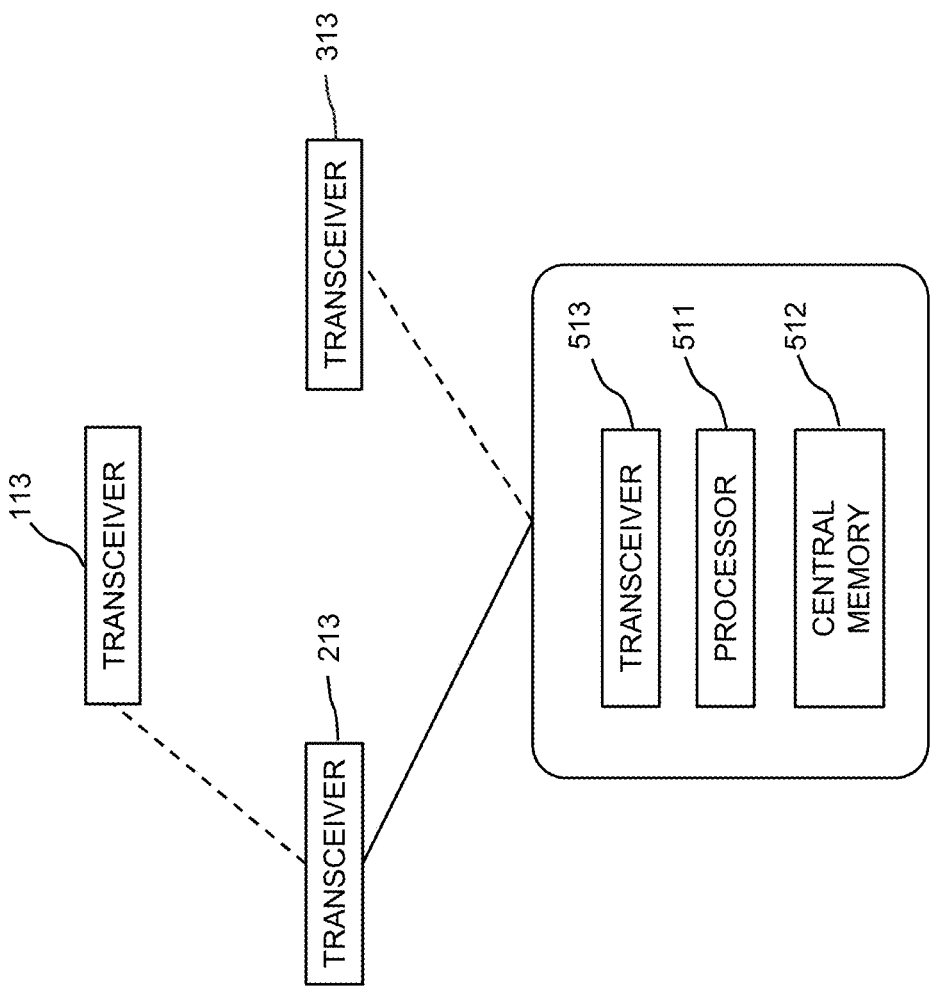

TARGETED ALERT SYSTEM FOR A WORK ENVIRONMENT

CROSS-REFERENCE

This application is a continuation of International Patent App. No. PCT/US2023/077312, filed on Oct. 19, 2023, the contents of which are incorporated herein in their entirety.

TECHNICAL FIELD

This application relates to alert systems used to call attention to certain sensed conditions, such as when incoming data is outside of specified parameters. The systems and implementations described herein improve upon existing alert systems by directing alerts to specific individuals based on specified information.

BACKGROUND OF THE INVENTION

Alert systems are used in a variety of work environments to call worker attention to an issue. There are alerts from one's phone, alerts from one's car, and alerts from the environment around people—often so many that people become immune to all the alerts, which can lead to an important alert being missed. This "alert fatigue" is particularly problematic where alerts are generalized instead of targeted. With a generalized alert, it becomes easy to assume that the alert is intended for someone else. For example, when a car alarm goes off in a busy parking lot, everyone assumes it is not their car.

While the present invention could be configured to work in various applications as one of skill in the art would appreciate, two particular applications are explored. The first is a hospital and the second is a production facility. In both of these environments there is sophisticated equipment outfitted with sensors to identify when a parameter is outside of a range. For example, a respirator may note that oxygen level of a patient has fallen below a designated level, or a camera may identify that there are fewer than a pre-selected quantity of widgets left on a supply line. This application assumes that the machinery can detect the alert condition, and instead addresses how, where and to whom to transmit the alert.

In a production facility, there may be many workers assigned to many tasks, but there is typically also a lot of automation. If everything runs smoothly, the system may be tuned to work quite well. But when issues are left unaddressed it can affect the entire system. For example, there may be a part shortage, a mechanical failure, a computer error that results in mismatched parts, etc. Each of these things may trigger a general alert, such as a RAWLS light or an audible alert. But if this happens often and it is not clear who has the responsibility to address the issue, it can lead to system delay or shutdown.

A hospital environment is similar in that it has a number of workers and a large amount of automated and sophisticated equipment capable of identifying a fault condition. This equipment also triggers alerts that need to be addressed but that are traditionally just audible alarms. It is difficult to tell from a distance what room the alarms may be coming from, and they don't provide any detailed information. The audible alerts can become very distracting for workers to whom the alert is not directed. For example, if each nurse on a floor is assigned six rooms (or perhaps only two if an intensive care unit), it is very likely the alert may be for someone else. This causes multiple people to react to an alert, or worse yet in a case of alarm fatigue, no persons at all. Further, the various audible alerts can be very disruptive to family members, visitors, and even patients for whom the alerts are not intended.

What is needed is an alert system for work environments that is configured to provide targeted alert messaging to particular individuals based on prescribed data of who has responsibility for the issue at hand. If that person can't be reached, contact with others can be attempted before defaulting to the generalized traditional alert.

SUMMARY OF THE INVENTION

The invention is defined by the appended claims. This description summarizes some aspects of exemplary embodiments and is not intended to limit the claims. Other implementations are contemplated in accordance with the techniques described herein, as will be apparent to one having ordinary skill in the art upon examination of the following drawings and detail description, and such implementations are intended to be within the scope of this application.

Equipment and systems are described herein that can be configured to operate a targeted alert system in a work environment. In one embodiment, the system generally comprises an alert control unit attached to a monitoring device. The monitoring device is equipped with a speaker and is configured to issue an audible alarm when certain conditions are met. But the alert control unit initially mutes the speaker and attempts to contact a first worker for whom the alert is intended. The alert control unit may determine the first worker's identity based on the alert control unit's present location. Each worker is assigned an identifier device equipped with a wireless transceiver. The alert control unit sends the alert wirelessly to the identifier of the first worker. If a response is received from the first worker's identifier acknowledging the alert, the alarm control unit may continue to mute the alert until the alert is addressed by the first worker. If not, the alert control unit may attempt to contact a second worker or may un-gate the audible alarm thereby allowing the general alert to proceed.

In some embodiments, the alert control unit may contact a locator unit to identify the first worker. In some embodiments, the alert control unit may locate itself within the work environment by sending pings to locator units having fixed positions within the work environment. Each locator unit may be equipped with a locator code that identifies a particular room number or location within the work environment. The alert control unit may determine its location by receiving and recording chirps of decreasing decibel level at a frequency range imperceptible to the human ear until it only receives a response from the locator unit closest to it, typically within the same room.

In some embodiments, the alert control unit will append the alert message with the location of the alert control unit. The identifier device may be a wearable device with a heartbeat or similar detector to confirm that it is being worn. If the targeted wearable device receives an alert and detects that it is not being worn, it may immediately respond to the alert control unit with a refusal. In some embodiments, the alert control unit may be connected to multiple monitoring devices, and may be able to identify within the alert it transmits a type of monitoring device that generated the alert, along with a parameter. In some embodiments, the targeted alert sent by the alarm control unit is a non-audible alert. In other embodiments, it is an audible alert that only broadcasts through an in-ear speaker worn by the first worker.

In another embodiment, the system generally comprises a hub connected to a plurality of locator units, each locator unit having a fixed position within a work environment. The system further comprises a series of monitoring devices, each connected to a separate alarm control unit configured to gate the speaker output of an audible alarm generated by the monitoring device. When gating the speaker output, the alarm control unit sends a wireless signal to the hub via the nearest locator unit. The hub then determines a first worker to receive the signal based at least partially on an identification of the locator unit. The first worker is equipped with an identifier device having a transceiver for receiving the alert from the hub and responding with a confirmation. If no confirmation is received, or if a pre-determined period of time elapses, the alert control unit will stop gating the speaker output of the audible alarm.

A better understanding of the disclosure herein will be obtained from the following detailed description and accompanying drawings.

DESCRIPTION OF THE DRAWINGS

FIG. 3B illustrates a mapping of communications between the transceivers of various components of a targeted alert system in accordance with alternative embodiments having a central hub.

FIG. 3C illustrates a mapping of communications between the transceivers of various components of a targeted alert system in accordance with still other embodiments having a central hub.

DETAILED DESCRIPTION

Figure 1:
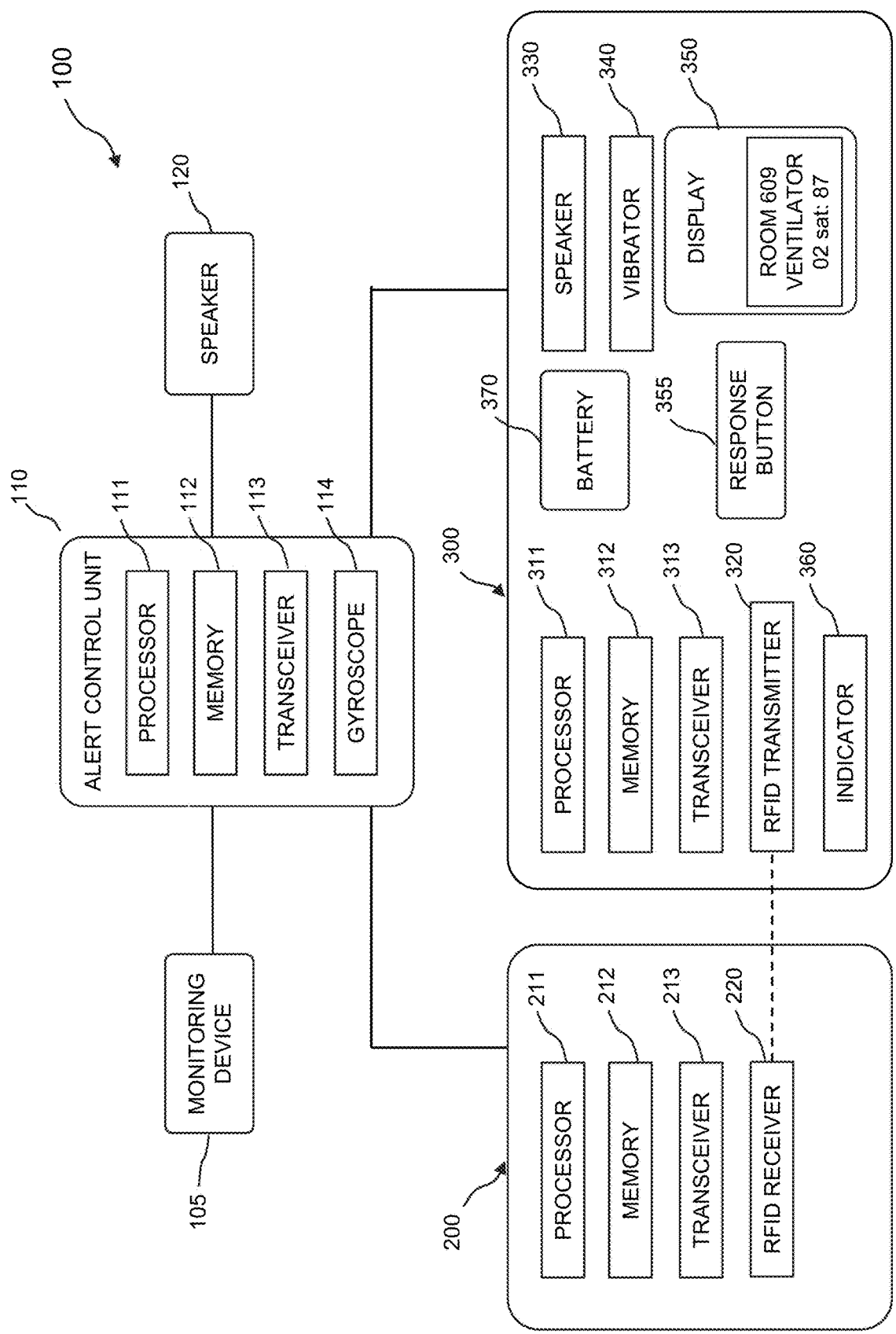
FIG. 1 is a system architecture map showing various components of a targeted alert system and their connections in accordance with a particular embodiment.

The description that follows describes, illustrates and exemplifies one or more embodiments in accordance with its principles. This description is not provided to limit the disclosure to the embodiment(s) described herein, but rather to explain and teach the principles of the invention(s) disclosed herein in order to enable one of ordinary skill in the art to understand these principles and, with that understanding, be able to apply them to practice not only the embodiment(s) described herein, but also any other embodiment that may come to mind in accordance with these principles. The scope of the disclosure is intended to cover all such embodiments that may fall within the scope of the appended claims, either literally or under the doctrine of equivalents.

Embodiments described herein include a system designed to send targeted alerts only to the persons responsible for reacting to them. The system is designed to work in association with one or more monitoring devices. Monitoring devices may take many forms, but in the context of this disclosure, a monitoring device is a machine that monitors some variable and is configured to generate an alert when that variable falls outside of a particular range. The range is typically programmed into the monitoring device and may be adjusted by an authorized worker. The alert may be in any manner of forms such as an audible signal, a visible signal, a haptic signal, a text message, etc.

The disclosure refers to both general and targeted alerts. A general alert is, for example, a siren that makes a loud sound in a frequency audible to people within the surrounding vicinity. By contrast, a targeted alert is a siren (or other signal/message, etc.) generally perceptible only to a particular intended recipient. A general premise of the invention is that targeted alerts are preferred over general alerts and should be attempted in at least a first instance. Only if targeted alerts fail to bring timely attention to the monitoring device should a general alert be issued.

While the alert system disclosed herein could be applied to a variety of work environments, an exemplary environment for the system is a hospital floor. On a typical hospital floor there are a variety of rooms, each housing at least one patient. Each patient is typically connected to a variety of monitoring devices. For example, there is typically a vitals monitor that tracks variables such as the patient's heart rate, blood pressure, and oxygen saturation. There is also often an IV pump or food pump that delivers a medication or food at some desired rate. If the patient is on a ventilator or supplemental oxygen, there will be a separate monitoring device associated with various pressure readings. When any of the variables measured by these various monitoring devices fall outside of an established range (which may be set by a nurse or doctor based on a variety of conditions), the monitoring device detecting the abnormality will issue a general audible alert.

This general alert will typically continue until a nurse or someone presses a button acknowledging the issue and taking appropriate action. Often general alerts are triggered by something so mundane as a medication delivery being complete or a patient rolling over in a manner that causes a sensor to not read properly. A nurse can quickly correct these issues and move on. In other cases, it may be an instance where the nurse needs to call a doctor or some other specialist to address a more significant problem. In any event, the instances of general alerts in a busy hospital floor are so commonplace that workers (and patients and guests) suffer alarm fatigue. Workers may be confused as to whether the alert applies to them and not react to it. Patients or guests may attempt to address the alert themselves, causing a loss of data and/or causing something important to be missed.

The targeted alert system described below would address this problem in the instances described above by first attempting to send a targeted alert to the specific nurse assigned to the patient connected to the alert-generating monitoring device. The targeted alert can provide more than just an audible alarm. For example, it can transmit to the specific nurse (or other targeted worker) a message identifying (1) the location of the patient (e.g., the room number), (2) the type of equipment that is generating the alert (e.g., a vitals monitor), and (3) what the variable is that has triggered the alert (e.g., oxygen saturation has fallen below 88%). Such information allows the specific nurse (i.e., the targeted worker) to understand the gravity of the fault and where to go to address it and does so without causing confusion or annoyance to others.

As will be described below, the system also accounts for various phenomena that could go wrong in such a system. First, it must properly determine who the targeted worker is for the alert. Second, it must have some way to reach only that worker. The described alert system also has the ability to confirm whether the alert was received by the targeted worker, and logic to determine what to do if it was not received or if the alert condition is not addressed within a set amount of time. The system also can be configured to account for a scenario, as often happens in a hospital environment, where monitoring devices frequently change location.

FIG. 1 shows a system overview of a targeted alert system 100, according to certain embodiments of the present invention. Monitoring device 105 is connected to speaker 120, which may be used to broadcast a general alert. However, in between the monitoring device 105 and the speaker 120 is an alarm control unit 110 that is configured to at least temporarily intercept the general alert while a targeted alert is attempted. The monitoring device 105 with built in speaker 120 existed in the prior art, but the alarm control unit (or "ACU" as used herein) did not. An ACU typically includes at least a small processor 111, memory 112, and a wireless transceiver 113. The ACU may be embedded in the circuitry of the monitoring device, but it also may be a separate device attachable to existing (prior art) monitoring devices not equipped with an ACU.

Figure 2:
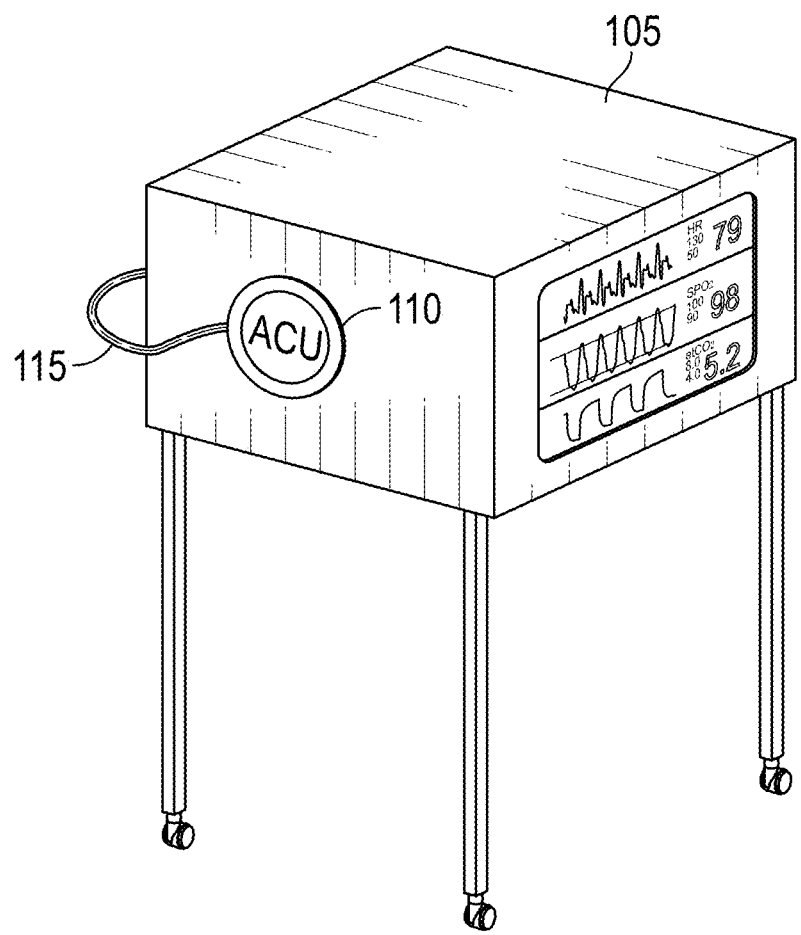
FIG. 2 is an illustration of a monitoring device with an external alert control unit attached and connected.

FIG. 2 shows an exemplary prior art monitoring device 105 having a traditional screen showing readings of particular vital signs. However here, a separately packaged ACU 110 has been attached to the side of the monitoring device, such as via a magnet or a clip. In cases where the ACU is separately housed, it may come in a small package with such an attachment mechanism and will also have a cable or other wiring harness 115 for electrical connection to the monitoring device 105. This allows the ACU 110 to send a signal to intercept and gate off the speaker 120 of the monitoring device while a targeted alert is being attempted. The connection could be, for example, via universal serial bus (USB). The connection may also provide power to the ACU, in which case the connection is a multi-pin cable or, in some cases, multiple separate wired connectors. The ACU may also have a backup battery power source. In some embodiments, software will need to be installed on the prior art monitoring device in order for the monitoring device to recognize and comply with the commands sent from the ACU. Ideally in cases where the ACU is a separate, tacked on device, it travels with the monitoring device 105 to which it is assigned and is only removable by management personnel capable of re-assigning it to a different piece or type of monitoring equipment.

Other principal system components are locator unit 200 and identifier device 300. While each ACU 110 in this described embodiment is attached to a monitoring device 105 that may change location within the work environment, each locator unit 200 is mounted in a generally fixed position. For example, in an exemplary embodiment, each patient room of a hospital would have a locator unit 200. There may also be locator units associated with and fixed within rooms where patients might likely be temporarily found, e.g., a radiology room, a prep room, an operating room, etc. Each locator unit may have a processor 211, a memory 212, and a wireless transceiver 213. It may also be equipped with an RFID reader 220. Among other things, the memory 212 may store the locator unit's fixed location. If a locator unit is moved, this stored location would be updated manually through a user interface as described below.

In the exemplary embodiment, the network of locator units 200 serves two primary purposes. First, the locator units help the ACUs 110 locate themselves within the working environment so that the ACUs can identify their location to the targeted worker as part of a targeted alert. Second, the locator units may be used to identify the targeted worker(s) to whom the targeted alert should be sent. Each of these purposes will be more fully described below.

Each worker that may potentially be a targeted worker is assigned an identifier device 300. In the hospital example, this would at least be the nurses assigned to patients, and could include other workers such as respiratory therapists, pharmacists, or other specialists that may be available to respond to a particular alert type. While doctors might also have identifier devices, they typically are only contacted if the primary staff cannot resolve an issue. The identifier device 300 can take on many forms but is preferably a wearable device connected to the worker in a non-distracting way, such as a wrist-band or headset. Each identifier device 300 is ideally equipped with a processor 311, a memory 312, and a wireless transceiver 313. They may also have an RFID transmitter 320 and either a speaker 330, a vibrator 340 or both for the purpose of calling the attention of the targeted worker to a targeted alert.

The identifier device may also have a visual display 350 to display a written message, such as specific parameters or variables associated with the alert that may be contained within the written message. The identifier device 300 should also have a user interface 355—even if it is a single depressible button—that allows the targeted worker to whom the identifier device is assigned an opportunity to accept or reject the targeted message. In some cases, the identifier device 300 may have a presence indicator 360 that indicates if it is being worn. Each identifier unit will also have a battery 370 or other power source, which may be rechargeable such as via a USB connection.

The main function of the identifier unit 300 is to deliver the targeted alert to the targeted worker and to provide a response back to the ACU that sent the alert. Ideally, that response is an acknowledgment, which will cause the ACU 110 to continue to gate off the general alert speaker 120. However, the identifier unit 300 may also deliver a "no presence" message, a pass message, or may not respond at all. A "no presence" message indicates that the presence indicator 360 has determined the identifier device 300 is not being worn. A "pass" message indicates the targeted user is unavailable or has otherwise indicated via the user interface 355 that they cannot respond to the alert at this time. A non-response may indicate a system malfunction, or that the identifier device 300 is not in range. Any of these responses may cause the ACU 110 to send the targeted message to a secondary targeted worker, or to allow the general alert to play over speaker 120 if no secondary targeted worker is available who corresponds to the alert type. All of the responses may be recorded by the ACU and stored in its memory 112 or a central memory for later management diagnostics and general system monitoring.

It should be noted that the alert control system could be configured by system administrators to react in various ways to different responses (or no response) from the targeted worker. For example, some administrators may want the system to default to a general alert immediately if the presence indicator 360 of a targeted worker's identifier unit 300 indicates the identifier unit is not being worn, or if the targeted worker indicates a "pass" or otherwise refuses the alert. Instead of trying a secondary targeted worker, the general alert will sound. Administrators may also set any delay time while the system waits for a response to be very quick. Whatever the criteria (no worker presence, worker refuses, too much delay in responding or in addressing the fault), these events all result in the alert control unit determining the targeted worker is unavailable. Whether the alert control unit then attempts a secondary targeted worker depends on system configuration and whether another appropriate worker is listed as available in the locator unit.

The identifier unit 300 may also be used to identify to a particular locator unit 200 that the worker associated with the identifier unit 300 is on shift and responsible for any patients and monitoring devices 105 in the room to which the particular locator unit 200 is assigned. This can be done via an RFID scan at the beginning of a shift. For example, a nurse arrives for a 7 AM shift. After doing a traditional handoff with the night shift nurse, the day shift nurse scans his identifier device 300 near the locator unit 200 for each room the day shift nurse will be covering. By doing so, the RFID transmitter 320 within the day shift nurse's identifier device 300 communicates the identity of the nurse to the locator unit's RFID receiver 220, which is then temporarily stored in the memory 212 of the locator unit. The identity of the day shift nurse may replace the stored identity of the night shift nurse that was previously stored. Thus, the identity of the nurse presently on shift and covering the room in which the locator unit 200 is installed is available upon request to each ACU 110 that may be in that room and needing to send a targeted alert. In that same manner, a respiratory therapist or other worker assigned to cover a particular room can scan their identifier devices 300 in order to be "on call" for targeted alerts associated with that location. While RFID is used as an example here, persons of skill in the art will understand that other known technology could be substituted to allow workers to "check in" with particular locator units. For example, the identifier units could have a QR code or barcode that is scanned by an optical reader on the locator unit, or the locator unit may present a keypad used by workers to enter an ID number associated with them.

In a particular embodiment, each locator unit 200 stores a lookup table of worker assignments for the room based on who has most recently scanned in for a given role. In some embodiments, the lookup table is accessible to the ACU 110. In other embodiments, the locator unit processor 211 is configured to respond with the presently stored identity of the worker corresponding to a particular type of alert call received from an ACU 110. For example, an alert call from the ACU transceiver 113 may identify that the alert is from a ventilator. The processor 211 may be programmed to recognize that, in response to an alert coming from a ventilator, it should respond with both an identification associated with the nurse assigned to the room and the identification associated with the respiratory therapist on call. In this manner, if the ACU 110 is unable to get confirmation from the nurse (e.g., the primary targeted worker), it can attempt a targeted alert to the respiratory therapist (e.g., the secondary targeted worker). Of course there may be tertiary options, and so forth, depending on the alert type. However, either the ACU processor 111 or the locator processor 211 or both may have logic to prevent sending a targeted alert to an individual identified in the lookup table that does not correspond to the alert type. For example, the system would not send a targeted alert to a respiratory therapist in response to a food pump misfeed error.

It will be apparent to a person of skill in the art that the system architecture described is not limited to the particular examples provided. For example, some hospitals may operate with nurse teams where multiple nurses may scan in to a particular locater unit for the same shift. One may be designated as primary and the other as secondary for a particular room and vice versa for the next room. Indeed, the architecture could be used in a variety of situations outside of a hospital setting where the workers scanning to a locator are specialists that the system would recognize as corresponding to a particular fault time or alert, e.g., an electrician for an electrical fault, a mechanic for a mechanical fault, and so forth.

As previously explained, the locator units serve two primary functions. The function of identifying the presently assigned workers has been explained. But the locator units also may serve the function of helping the ACUs identify their location. As noted, the monitoring device 105 to which an ACU 110 is attached may frequently change location in some work environments. In such cases, it is not useful to program a location into an ACU. Rather, an ACU must periodically confirm its location for purposes of including its location as information within a targeted alert. In a particular embodiment, an ACU may be programmed to ascertain its location upon powering up, every hour thereafter, and (if equipped with a motion detector/gyroscope 114), each time it comes to rest after sensing movement. In some embodiments, if the location can be confirmed quickly, the ACU may be configured to re-confirm its location each time the monitoring device to which it is attached triggers an alert.

In the exemplary embodiment where the work environment is a hospital floor, the "location" of an ACU is typically associated with a particular room number. The targeted worker(s) will be familiar with these room numbers, and this requires only a small amount of data to accurately determine the alert location. In one embodiment, in order to triangulate or otherwise determine its location, an ACU transmits a short data message (a "ping") that is recognized by each of the locator units 200 in the work environment. In response to this ping, each locator unit 200 emits a chirp every few seconds at a frequency inaudible to the human ear. Each chirp contains a code to identify the specific locator unit 200 that emitted it and is emitted at a decibel level 5 dB less than the last chirp emitted by the locator unit. When the ACU 110 can only hear a single chirp, that chirp is coming from the locator unit in the room with the ACU. The ACU has thereby determined its room location.

In other embodiments, the ACU 110 may be the device that emits the chirp at ever-decreasing dB levels. Each locator unit that hears the chirp will respond with its room assignment. Eventually the ACU will receive only one response, which will then be the locator unit in the room with the ACU. In still other embodiments, each locator unit receiving a ping from an ACU will respond with a response data ping that contains information to determine the room assignment of the locator unit sending the ping. The ACU tabulates the response time for the returning pings, allowing it to narrow down the list of candidate locator units that may be in the room where it is located by selecting the quickest responses. The ACU then may further narrow this list down to one using the audible method described above.

The system described above may operate without central control. In such cases, data may be retained and retrieved from the memory units in the respective ACUs, identifier devices and/or locator units. However, in some embodiments there exists a central hub 500 having a central memory 512. The term "hub" is not intended to be limiting, and rather simply refers to a computing device that houses or is connected to the central memory 512. The hub may be a desktop computer located in the work environment or may be a dedicated device that receives and sends information through the system and captures it into the central memory 512. The central memory itself may be within the hub or stored in a remote server farm accessible via an internet-based user interface, for example.

There are several potential advantages to having a targeted alert system with a central memory/hub control. First, such a system provides a consolidation point for the various data captures of the decentralized units of the system, i.e., the ACUs, the locator units and the identifier devices. This allows for the creation of management reports that can track various system metrics and diagnose issues that arise. For example, if general alerts are often being triggered on a certain shift, or from rooms to which a particular worker is assigned, the hub 500 would be able to generate reports showing a likely root cause. Perhaps a worker is consistently not wearing their identifier device, or perhaps it reveals staffing issues. Second, maintenance aspects of the system can be remotely controlled from the central hub 500. There are many potential maintenance aspects, such as assigning or updating identifier devices to new workers or disabling devices not in service, updating or assigning a location to a locator unit that has been moved or newly installed, or setting system parameters such as the length of time an ACU will attempt to resolve a fault via targeted alerts before allowing a general alert to proceed. Of course these changes could be made individually at each ACU, locator unit and identifier device, but this would take much more time (particularly in larger work environments) and would require each of these devices to have some form of user interface to take commands.

Figure 3A:
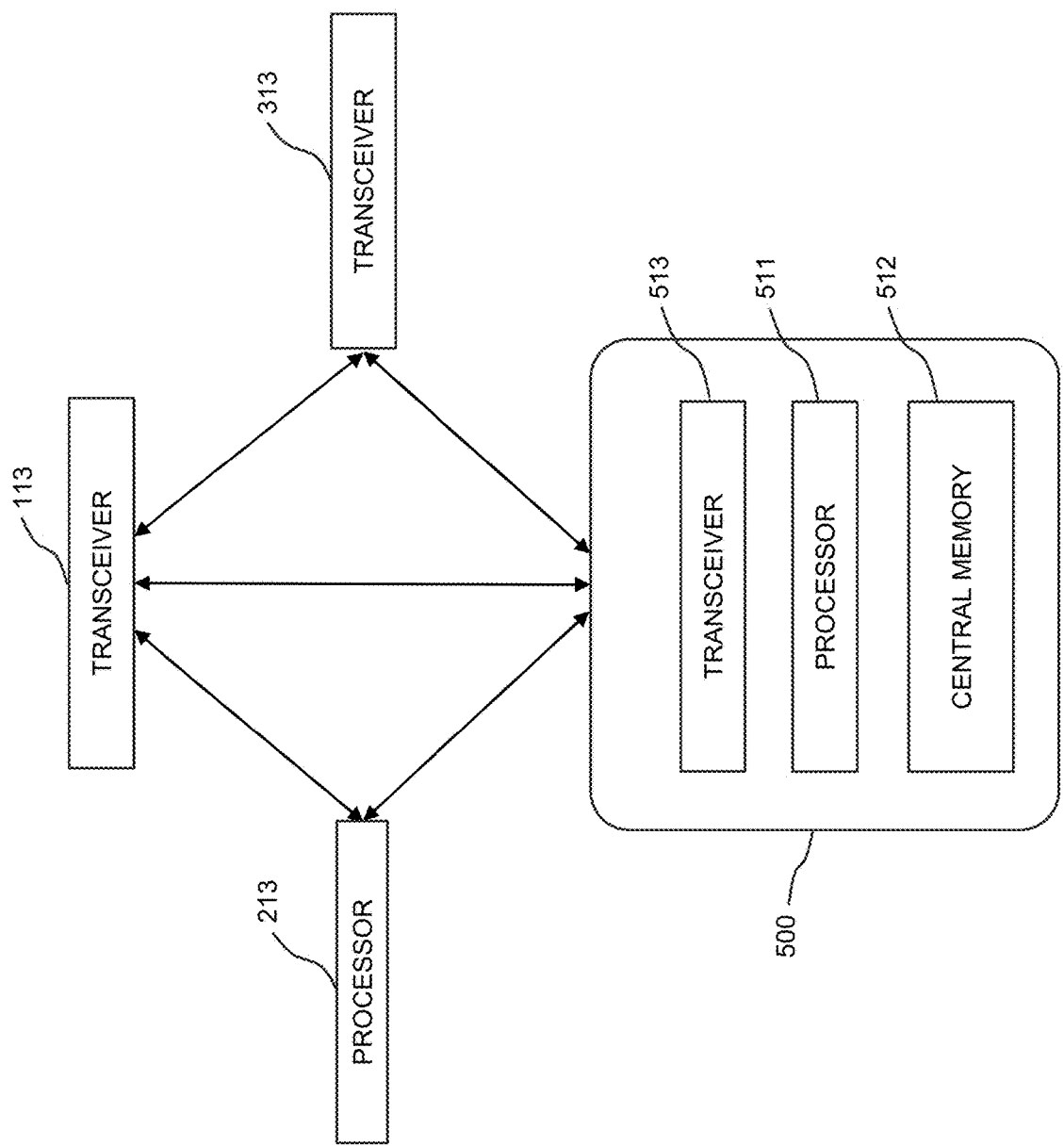
FIG. 3A illustrates a mapping of communications between the transceivers of various components of a targeted alert system in accordance with certain embodiments having a central hub.

FIGS. 3A and 3B show a couple of different ways a targeted alert system central hub 500 could communicate with the other system components. As discussed above, the central hub 500 may be fully consolidated into a single computer and physically located in the work environment or it may be distributed such that its memory 512 and/or processor 511 are remotely located. But either way, there is preferably some locally-placed mechanism (here a wireless transceiver 513) for receiving communications from the various other system components. In FIG. 3A, the targeted alert system operates much as it does in FIG. 1 where no central hub is disclosed. Communications move directly between the individual system components. But the communications are also sent to a central transceiver 513—either in real time as the communications are being sent, or in batches as part of a periodic data log upload from the individual devices. For example, an ACU would send a data log identifying all alerts that were triggered over a period of time, what triggered the alert, what targeted alerts were attempted, the amount of time for response, what identifier devices were contacted, etc.

FIG. 3B is an example of a targeted alert system where all communications pass through the central hub 500, such that the central transceiver 513 acts as a relay between the various devices. In this embodiment, the communications are all captured real time and there is no need for the individual components to upload any diagnostics. The central hub 500 can monitor the entire system as it is operating and may be configured to make adjustments or re-direct targeted alerts to different targeted workers if issues are recognized. However, each ACU would still need to communicate directly with the locator units to perform the location function described above.

This application has thus far generally referred to the use of wireless communications between transceivers, such as over a WiFi network operating in accordance with IEEE 802.11 standards. In some embodiments, these communications may be encrypted, and the various system elements would have software for encryption/decryption. Persons of skill in the art will understand that such a system may utilize a series of retransmission nodes efficiently placed throughout the work environment to ensure messages can reach across the work environment. However, there may be a desire for a backup or alternative communication system that is hard-wired. FIG. 3C illustrates a system where each of the fixed-position locator units 200 are hard-wired to a central hub 500. The solid line connecting locator unit transceiver 213 to central hub transceiver 513 represents a wired connection, while the dashed lines represent wireless connections. In this embodiment, the ACU only needs the capacity to contact the locator unit 200 in its room. This could be, for example, via a Bluetooth or other short range wireless connection. The locator unit then transmits a targeted alert communication to the central hub 500, which transmits the targeted alert out to the appropriate identifier device transceiver 313 via a standard wi-fi communication.

In embodiments having the communication arrangement shown in FIG. 3C, much of the logic described above associated with an ACU, such as determining where to direct a targeted alert, may be instead located on the central hub processor 511. Not only does such a system ensure the central hub 500 can collect and track the data needed for providing reports, etc., it also reduces the cost and complexity of the various ACUs in the system. Similarly, instead of having the locator units store information about worker room assignments, the previously mentioned lookup table could be stored in the central memory 512. Another advantage is that control and decision logic can be centrally placed where more information is available, leading to potentially better decisions. For example, the system could actively track the location of the identifier units via the central hub 500, allowing the central hub to possibly redirect a targeted alert to a different targeted worker based on their proximity to a particular monitoring device experiencing a fault.

Another advantage of centralized real-time information provided through connections to a central hub 500 is the ability to provide a real time view of the overall system operation, such as through a distributed application downloadable to a mobile device. The application software could present a user interface that is populated based on information received over the internet from the central hub 500 that could show, for example, which workers are assigned to which rooms of the hospital, which workers are "present" (i.e., wearing their identifier devices) in the work environment, where a particular ACU is presently located, average response time to targeted alerts, number of general alerts triggered during a shift, etc.

Figure 4:
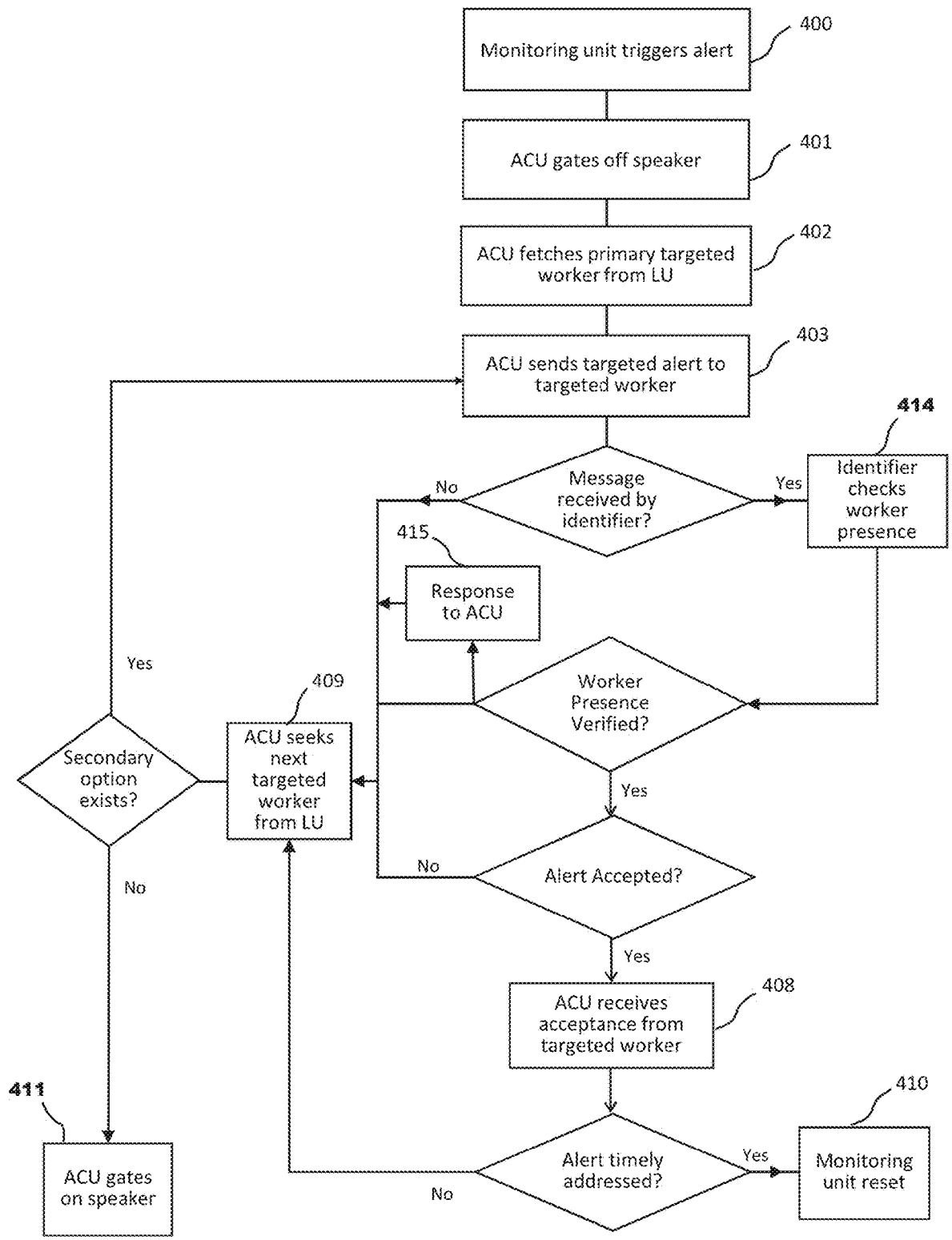
FIG. 4 is a flow chart illustrating the steps of a targeted alert system in sending alerts according to certain embodiments.

FIG. 4 illustrates a flow chart showing the steps of an exemplary targeted alert system in accordance with one or more of the above-described embodiments. The process starts at Step 400 when a monitoring device 105 identifies that a monitored variable is outside of a pre-defined range. For example, the monitoring device 105 may be set to trigger a general alert if a patient's heart rate falls below 40 beats per minute. Assuming that has happened, the monitoring device 105 will send an electrical signal to its speaker 120 that will cause the speaker 120 to broadcast a general audible alert. However, this does not happen here because at Step 401, an alert control unit (ACU) 110 attached to or embedded within the monitoring device intercepts the electrical signal to the speaker 120 and prevents it from sounding the general alert. The ACU 110 then (at Step 402) contacts the locator unit 200 within the room where it is located to determine the identity of the primary targeted worker associated with the alert type. Usually, this is the nurse assigned to the patient. The ACU 110 will already know the proper locator unit 200 to contact because it will have performed a self-locating procedure so that it knows the room it is in.

Now that the ACU 110 knows its room location, the alert details, and the identifier device to contact (i.e., the identifier device 300 associated with the primary targeted worker), at Step 403 the ACU 110 sends a targeted alert to the identifier device 300 assigned to the primary targeted worker. What happens next will depend on whether the ACU 110 receives an acceptance of the alert back from the identifier device 300 within a specified time. Several possibilities may prevent this. First, the identifier device 300 may simply never receive the message from the ACU 110. For example, the battery 370 on the identifier device 300 may have worn down, or the device 300 may be out of range. In this case, no response will be received. After a set period of time without a response, the ACU 110 will proceed to Step 409.

If the targeted alert is received by the identifier device 300, the device's presence indicator 360 will check to be sure it is being worn (Step 414). Again, this may be done by, for example, checking for the pulse of the wearer. If the indicator 360 identifies that the device 300 is not being worn, the identifier device transceiver 313 will send a response to the ACU 110 indicating as such (Step 415). Upon receipt of such a response, the ACU 110 will immediately proceed to Step 409.

If the device is being worn, the presence indicator 360 may trigger a message to the ACU 110 to report this, but mere presence of the primary targeted worker is not enough to avoid Step 409. Rather, the targeted worker must take the affirmative step of accepting the alert through a user interface of the identifier device 300, such as response button 355. Selection of this button 355 causes the identifier device transceiver 313 to send a message back to the ACU 110 that the targeted alert has been accepted. In some embodiments, the user interface may have an option to refuse the targeted alert. In that case, the identifier device transceiver 313 sends a message indicating the refusal to the ACU 110 and the ACU proceeds immediately to Step 409 upon receipt. In other embodiments where there is no refusal option, or if the targeted worker simply does not respond for whatever reason, the system will react the same as if the targeted alert was never received and, after a time, will move to Step 409.

There could be many reasons that a targeted worker might not respond, or might refuse, a targeted alert. For example, the nature of the alert (alert type) might be of a nature that another worker is in a better position to respond. The targeted worker might be unavailable due to, for example, an emergency with another patient. In some embodiments, the targeted worker may be able to enter a reason for refusal and/or manually redirect a targeted alert to another worker that is covering for them temporarily. It should be noted that the period of time for delay to await a response from the identifier device 300 should not be long. About thirty seconds would be reasonable for most alerts. In some cases, the ACU may be configured to recognize certain alert types as more significant/requiring quicker response than others. Where this is the case, the ACU may be configured to have a shorter delay (wait) time for high priority alerts, such as around ten seconds, before moving on to Step 409.

If the process reaches Step 409 (for whatever reason), the ACU 110 is configured to try a different targeted worker (i.e., a "secondary targeted worker," and so forth. Thus, at Step 409, the ACU 110 again reaches out to the locator unit 200 to determine if there is a secondary (or next) targeted worker in the present lookup table for the alert type. In some embodiments, the ACU 110 may gather this information in the initial call to the locator unit 200 when it retrieved the identity of the primary targeted worker. If there is a secondary (or next) targeted worker in the lookup table corresponding to the alert type, the ACU 110 redirects the targeted alert to that worker (Step 403) and the process loops until either (1) the ACU 110 receives an acceptance from a targeted worker or (2) there are no more targeted workers in the lookup table corresponding to the alert type for the ACU 110 to reach out to. In the latter case, the ACU 110 un-gates the signal to the monitoring device speaker 120, and the general alert sounds (Step 411).

Even if there is an acceptance by a targeted worker, this does not mean that the general alert will be prevented. Rather, the targeted worker that accepts the targeted alert will have a period of time to reach the monitoring device 105 and address the fault. If that period of time is exceeded, the system will assume the targeted worker was detained and flow returns to Step 409 to either alert another targeted worker or sound the general alert. The period of time to address a targeted alert once accepted by a targeted worker is a selectable system parameter and may vary based on the alert type. However, it should be at least 60 seconds to allow the targeted worker to get to the monitoring device 105. Once there, the targeted worker can turn off the alert (Step 410) usually by pressing a button on the monitoring device and then assessing and remedying the situation that caused the alert in the first place.

As alluded to above, all of the actions (or inactions) of the system components and targeted workers through the above process may be recorded including response times, who was contacted, at what time, etc. This information can either be stored in the individual ACUs that send the targeted messages or can be stored in a central memory 512 to allow for the compiling of management reports, and other monitoring purposes.

Figure 5:
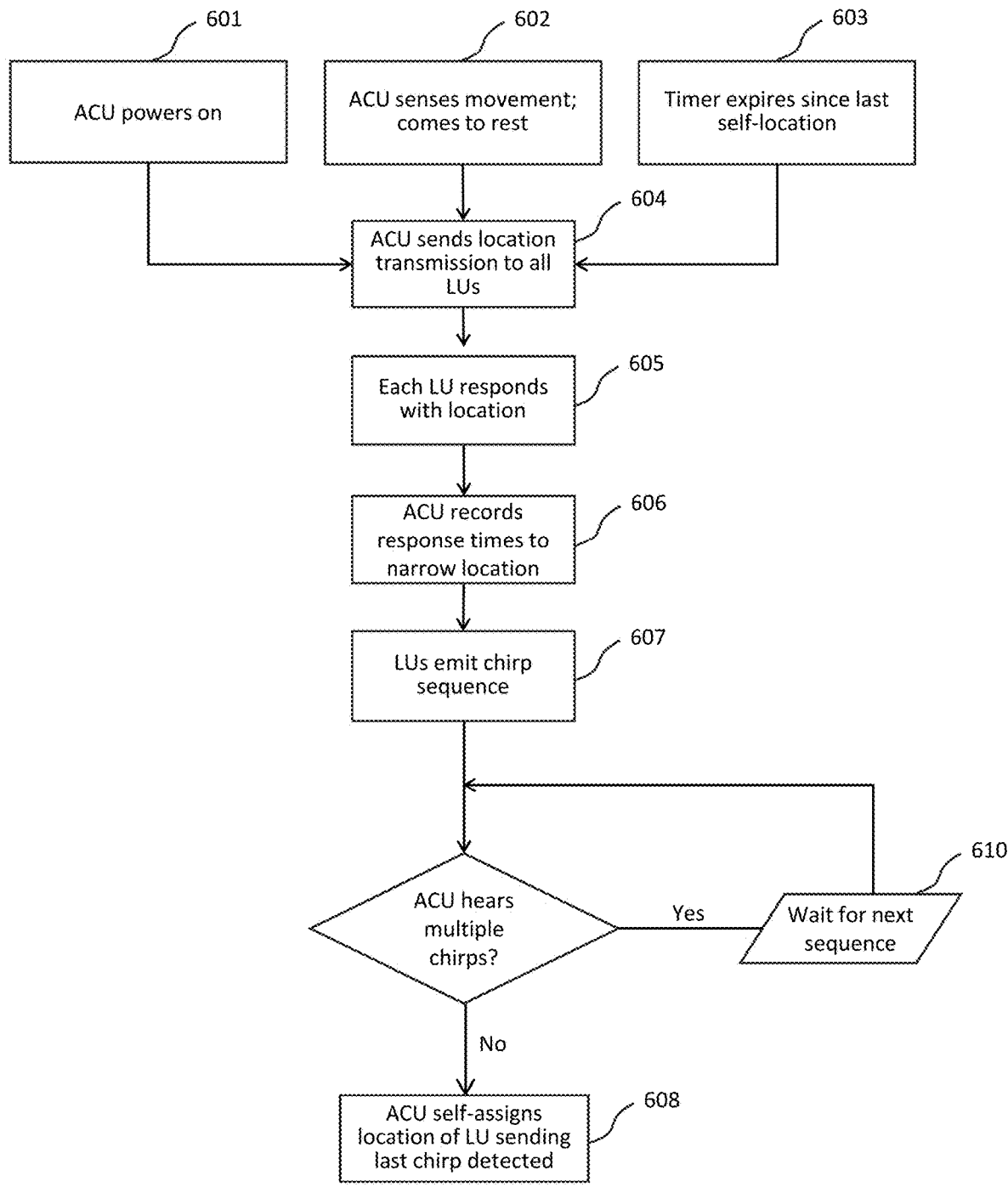
FIG. 5 is a flow chart illustrating the steps of an alert control unit self-location procedure according to certain embodiments.

FIG. 5 shows the process flow of a typical ACU location process, in accordance with certain embodiments. As discussed above, ACUs may frequently move around the work environment, and thus may be configured to recalibrate their position frequently. While they could be equipped with a GPS unit or the like, this is both expensive and not sufficiently accurate in most work environments. Rooms may be adjoining and may both have alerts going off simultaneously. It is important that the targeted worker knows with some confidence where the targeted alert they have accepted is coming from.

As mentioned, there are several actions that can trigger a relocation. At Step 601, the ACU has just been powered up. At Step 602, the ACU's gyroscope 114 comes to rest after a period of movement. At Step 603, a pre-determined period of time has passed since the last time the ACU 110 self-located. Any of these events lead to Step 604, which initiates the self-location process. The process begins with the ACU 110 broadcasting a self-locate message to the various locator units 200 within the work environment. Each locator unit is configured to respond to this message with a data ping indicating its assigned room number at Step 605. Recall that locator units generally do not move, and their room number is assigned to their memory 212.

At Step 606, as the response pings come in from the locator units, the ACU 110 records the time of each response. While this process operates on the micro-second level, it still gives an indication of the closer locator units because they will have a faster response time. This allows the ACU to narrow the options for its location down to a few potential rooms. The locator units 200 are configured to follow sending the response ping with a series of audio chirps having decreasing decibel levels that convey their room assignment (Step 607). The audio chirps are preferably at a frequency inaudible to the human ear. So long as the ACU 110 hears chirps from more than one room, it waits for the next audio chirp (Step 610) until it only hears one chirp. Then, at Step 608, the ACU 110 sets its location as the room associated with the single chirp. As a check on the success of the procedure, this location should correspond to one of the locator units 200 that responded most quickly to the original data ping. If not, the ACU may be configured to repeat the procedure. As discussed above, there are other methods of self-location the ACUs may use, and it should be understood from this example how the flow would operate in those other scenarios.

In some cases, the ACU may be unable to isolate a specific room/location with confidence. For example, the ACU may actually be located in a staging area outside of a room, or in a room with an open door across the hall from another room with an open door and, given the positioning of the nearest two locator units 200, the ACU cannot discern with confidence which is closer. This event should record a fault that is reported for potential adjustments to the system, but in the meantime the ACU is ideally configured to select the strongest signal, or select randomly from among equivalent signals, and assign itself the location associated with that signal/locator unit. This will at least get the targeted worker close to the monitoring device in question, and if there is no fault on the one they first check, the worker can check the one in the adjoining room or the hallway, for example. The ACU may be configured to send a location warning with the targeted alert to indicate the monitoring device with the fault may only be nearby/adjoining the indicated room rather than within it. In any event, the system is set up to issue a general alert if the fault is not timely located.

Though the targeted alert system 100 has thus far been described in association with hospital workers on a hospital floor, it has applications in many work environments that involve various processes tracked by monitoring equipment. An assembly plant is another good example. However, there are some differences that would warrant some system adjustment. First, instead of operating in small and distinct rooms separated by walls, system operation is generally in a vast open warehouse that may stretch several hundred yards in any direction. Here, typically rotating lights are used as the general alert instead of an audible speaker sound, because the environment is generally noisy anyway. While rotating lights may not be as disruptive as audible alerts in a hospital wing, the size of the work environment makes it difficult or impossible for a targeted worker to see the full area. Thus, it may take some time for an alert to reach the right person, and traditionally involves one person standing nearby paging others until the correct person is notified. Though there are no rooms, there are "stations" or some form of identification of where on the assembly line a particular procedure is taking place.

The monitoring systems are also different. Instead of monitoring patient vitals, monitoring devices may be monitoring the quantity of parts on hand, the width of a weld line that was just laid, or any number of physical tolerances as different components come together. Unlike in the hospital environment, monitoring equipment does not move around frequently. Thus, a modified version of the system may be used where the functions of the locator unit 200 and the ACU 110 are combined. That is, the ACU need not self-locate, and need not contact a fixed-location locator unit for a list of targeted workers because the ACU itself is generally fixed and may be assigned a particular station/location. Thus, the RFID reader (or other input device for recognizing workers) associated with the locator units in the hospital example may instead by placed on the ACU itself. The fixed location also facilitates use of a more advanced ACU that would be able to serve an entire station. Such an ACU would be connected to each monitoring device within that station and be able to differentiate between their fault identifiers in order to select the appropriate alert type and targeted worker based on which monitoring device has triggered an alert.

In an assembly plant, some of the stations may be fully automated such that there is no worker typically present. In this instance, the lookup table of the ACU would likely have a number of targeted workers depending on the fault type. For example, if there is a parts shortage, it would call someone in logistics to deliver more parts. If the issue is with a tolerance, it may call a mechanical engineer to assess the situation. If the issue is with line speed or delays, it may call a systems engineer, and so forth. Such people may be assigned to a large number of stations, so instead of using an RFID reader (or other input device for recognizing workers) for each ACU, the ACUs for an area may be networked to a central hub that would have the hardware for workers to check in. Targeted workers would then simply scan in their identifier devices at the central hub in order to "clock in" and receive targeted messages from the system. Thus, as explained above, the targeted alert system can be modified to fit the needs of the work environment while maximizing cost efficiency. However, the base concepts of the targeted alert system to avoid or bypass the prior art general alert is common among the various potential work environments.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A targeted alert system comprising:
a monitoring device configured to issue a general alert in response to detection of a fault condition;
an alert control unit electrically connected to the monitoring device and configured to temporarily prevent the general alert while a targeted alert directed only at a targeted worker is attempted;
wherein the targeted alert contains information about the location of the monitoring device.

2. The targeted alert system of claim 1, wherein the monitoring device monitors at least one variable condition, and the fault condition occurs when the at least one variable condition falls outside of an assigned range.

3. The targeted alert system of claim 2, wherein the monitoring device monitors multiple variable conditions, and wherein the targeted alert contains information identifying the variable condition to which the fault condition is related.

4. The targeted alert system of claim 1, wherein the alert control unit is configured to allow the monitoring device to issue the general alert if the targeted worker does not respond to the targeted alert in a set period of time.

5. The targeted alert system of claim 1, further comprising an identifier device associated with the targeted worker, wherein the alert control unit sends the targeted alert to the identifier device.

6. The targeted alert system of claim 5, wherein the identifier device comprises a response indicator usable by the targeted worker to accept the targeted alert, the response indicator sending an acceptance message back to the alert control unit when selected by the targeted user in response to the targeted alert.

7. The targeted alert system of claim 1, wherein the targeted worker is a primary targeted worker, and wherein the alert control unit is configured to send the targeted alert to a secondary targeted worker if the alert control unit determines that the primary targeted worker is not available.

8. The targeted alert system of claim 1, further comprising a locator unit associated with a particular location in a work environment, wherein the locator unit stores information identifying the targeted user, and wherein the locator unit transmits said information to the alert control unit upon request.

9. The targeted alert system of claim 8, wherein the locator unit receives the information identifying the targeted user via a wireless connection from an identifier device assigned to the targeted worker.

10. The targeted alert system of claim 1, wherein the alert control unit is configured to determine the location of the monitoring device within a work environment by communicating with a plurality of locator units, each locator unit located at a fixed location within the work environment.

11. An alert control system comprising:
a monitoring device for monitoring a variable, the monitoring device configured to issue a general alert when the variable falls outside a pre-defined range;
an alert control unit electrically connected to the monitoring device and configured to:
send a targeted alert to a targeted worker; and
temporarily block the general alert while awaiting a response from the targeted worker;
wherein the alert control unit allows the general alert to issue if the alert control unit determines the targeted worker is unavailable.

12. The alert control system of claim 11, further comprising a locator unit having a fixed location in a work environment, and wherein the alert control unit obtains information used to identify the targeted worker from the locator unit.

13. The alert control system of claim 12, wherein the locator unit selects the target worker from a list of potential target workers based at least in part on information conveyed by the variable.

14. The alert control system of claim 11, further comprising an identifier device assigned to the targeted worker, the identifier device configured to receive the targeted alert from the alert control unit.

15. The alert control system of claim 14, wherein the identifier device is configured to allow the targeted user to redirect the targeted alert to a second identifier device assigned to a secondary targeted worker.

16. The alert control system of claim 14, wherein the identifier device comprises a worker presence indicator and is configured to respond to the alert control unit that the targeted worker is not present if the presence indicator does not detect the targeted worker's presence.

17. The alert control system of claim 11, wherein the targeted alert comprises information identifying a type of the monitoring device and a location of the monitoring device.

18. The alert control system of claim 11, wherein the alert control unit is configured to perform a self-location sequence to identify its location within a work environment.

19. The alert control system of claim 18, wherein the self-location sequence involves the alert control unit sending a ping to a plurality of locator units, each of the plurality of locator units mounted at a fixed location within the work environment.

20. The alert control system of claim 19, wherein each of the plurality of locator units is configured to issue a response ping back to the alert control unit upon receipt of the ping from the alert control unit, wherein the response ping contains information that can be used to identify the location of the locator unit.

* * * * *